United States Patent
Hepler et al.

(10) Patent No.: US 11,994,231 B2
(45) Date of Patent: May 28, 2024

(54) LOW PROFILE MINIATURE SOLENOID PROPORTIONAL VALVE WITH SAFETY ENCAPSULATION

(71) Applicant: Parker-Hannifin Corporation, Cleveland, OH (US)

(72) Inventors: Aaron Hepler, Hollis, NH (US); Joel Verrecchia, Hollis, NH (US); Jim Burns, Hollis, NH (US); Phil Dodge, Hollis, NH (US)

(73) Assignee: Parker-Hannifin Corporation, Cleveland, OH (US)

( * ) Notice: Subject to any disclaimer, the term of this patent is extended or adjusted under 35 U.S.C. 154(b) by 116 days.

(21) Appl. No.: 17/791,998

(22) PCT Filed: Mar. 22, 2021

(86) PCT No.: PCT/US2021/023414
§ 371 (c)(1),
(2) Date: Jul. 11, 2022

(87) PCT Pub. No.: WO2021/211262
PCT Pub. Date: Oct. 21, 2021

(65) Prior Publication Data
US 2023/0051726 A1     Feb. 16, 2023

Related U.S. Application Data

(60) Provisional application No. 63/009,037, filed on Apr. 13, 2020.

(51) Int. Cl.
*F16K 31/06* (2006.01)
*H01F 7/08* (2006.01)

(52) U.S. Cl.
CPC ...... *F16K 31/0675* (2013.01); *F16K 31/0658* (2013.01); *H01F 7/081* (2013.01); *H01F 2007/086* (2013.01)

(58) Field of Classification Search
CPC .. F16K 31/0675; F16K 31/0658; H01F 7/081; H01F 2007/086; H01F 5/04; H01F 2007/062; H01F 7/1607; H01F 7/128
See application file for complete search history.

(56) References Cited

U.S. PATENT DOCUMENTS

| 4,679,767 A | 7/1987 | Vollmer et al. |
| 5,232,196 A | 8/1993 | Hutchings et al. |

(Continued)

FOREIGN PATENT DOCUMENTS

| DE | 4330325 A1 | 3/1995 |
| DE | 19700979 A1 | 7/1998 |

(Continued)

OTHER PUBLICATIONS

International Search Report and Written Opinion of the International Searching Authority for corresponding International Patent Application No. PCT/US2021/023414, mailed Sep. 27, 2021.

(Continued)

*Primary Examiner* — Marina A Tietjen
(74) *Attorney, Agent, or Firm* — Renner, Otto, Boisselle & Sklar, LLP

(57) ABSTRACT

A proportional solenoid valve includes a valve body defining an inlet and an outlet for a fluid flow through the valve body and an armature that is moveable along a longitudinal axis from a first closed position to a second open position to control the flow of fluid through the valve. The valve further includes a flux can and an encapsulated coil assembly encompassed within the flux can. The encapsulated coil assembly includes a bobbin, a wire coil wound around the bobbin, and a non-conductive encapsulation layer that encapsulates the bobbin and the wire coil so as to electrically isolate the wire coil from the flux can and other conductive components of the valve. When the solenoid coil is energized, a magnetic field is created which causes the armature (Continued)

to move away from the first position against the valve body toward the second position, thereby opening the valve. The proportional solenoid further includes insulated wiring that is electrically connected to the wire coil, and a non-conductive encapsulation tower that encapsulates the insulated wiring so as to electrically isolate the insulated wiring from the flux can and other conductive components of the valve.

18 Claims, 3 Drawing Sheets

(56) References Cited

U.S. PATENT DOCUMENTS

2010/0019179 A1* 1/2010 Nguyen ............... H01F 7/08
 251/129.15
2017/0370494 A1 12/2017 Verrecchia et al.

FOREIGN PATENT DOCUMENTS

| DE | 102006012530 A1 | 9/2007 |
| DE | 102008020101 A1 | 11/2009 |
| DE | 102008060889 A1 | 6/2010 |
| DE | 202016000441 U1 | 2/2016 |
| EP | 0679824 A2 | 11/1995 |
| EP | 3382244 A1 | 10/2018 |
| JP | 2019220617 A | 12/2019 |
| WO | 2016/176048 A1 | 11/2016 |

OTHER PUBLICATIONS

International Preliminary Report on Patentability from the International Preliminary Examining Authority for corresponding International Patent Application No. PCT/US2021/023414, mailed May 24, 2022.

* cited by examiner

LOW PROFILE MINIATURE SOLENOID PROPORTIONAL VALVE WITH SAFETY ENCAPSULATION

RELATED APPLICATIONS

This application is a national phase of International Application No. PCT/US2021/023414 filed Mar. 22, 2021, which claims the benefit of U.S. Provisional Application No. 63/009,037 filed Apr. 13, 2020, the contents of which are incorporated herein by reference.

FIELD OF INVENTION

The present application relates generally to solenoid actuator valves, and more particularly to solenoid actuator valves for use in high pressure and high flow applications in potentially explosive environments, such as for example in gas chromatography applications that may employ hydrogen gas as a flowing media or in a refinery where the gas mixture in the building could ignite given a spark.

BACKGROUND OF THE INVENTION

High pressure and high flow proportional solenoid valves are used in a variety of applications. For example, clinical laboratories and analytical chemistry laboratories employ gas chromatography testing processes to perform a variety of analytical tests. In such apparatuses, high pressure and high flow valves control the flow of gases or other fluids. Because it is desirable for such apparatuses to be as compact as practicable, the size of the valves remains a concern, but with reduced size sufficient speed and efficiency needs to be maintained. In addition, certain applications constitute potentially explosive environments. For example, some gas chromatography applications may employ hydrogen gas as a flowing media or may be used in a refinery where the gas mixture in the building could ignite given a spark.

Generally, it is desirable for the solenoid coil to be isolated from the flowing media, but operating in potentially explosive environments further invokes specific intrinsic safety requirements that include electrical isolation of the coil from other conductive surfaces within the valve structure. Representative industry safety standards are set forth in the IEC 60079-11 industry standards. In many conventional solenoid valve configurations, however, the coil is positioned to rest in close proximity to a conductive surface, such as for example the flux can, and thus such valves are not suitable for potentially explosive environments.

In addition to electrical isolation, it is desirable that solenoid valves used in potentially explosive environments still achieve efficiencies desirable in high pressure and high flow valve applications generally. Higher flow and pressure capabilities typically require a larger valve actuator to develop the sealing force needed for valve operation, which poses a significant challenge in balancing size and performance. To achieve higher flow, a larger orifice is required, and consequently a larger stroke to allow full flow to develop. However, this requires more magnetic attraction force from the actuator to overcome the large air gap.

Some improvement in the magnetic attraction force that drives the actuator can be made through magnetic material selection, but the performance difference between materials that are readily available and cost effective is limited. Additional improvements in attraction force can be made through increased coil power and number of wire turns, but there are diminishing returns once the soft magnetic materials have been saturated with the magnetic flux, and peak power budgets must also be considered. Increasing cross-sectional area of the flux path components allows more flux to be carried and thus increases the magnetic attraction force, but this must be balanced against the desire to reduce the valve size and weight for applications in which compactness is important. Accordingly, it has proven difficult to reduce valve size while maintaining efficient performance at the requisite high flows and pressures of solenoid actuator valves, and the additional safety requirements of potentially explosive environments further complicate optimizing valve performance. In addition, certain minimum distances between the magnet wire and any electrically conductive materials are dictated by the intrinsic safety standards. Maintaining these minimum distances while keeping desired valve performance for a desired valve size is difficult.

SUMMARY OF THE INVENTION

Aspects of the present application relate to a proportional valve, such as a pneumatic proportional solenoid valve, that provides an enhanced configuration as compared to conventional configurations. Embodiments of the present application can achieve a valve structure that is less than one third the size and less than one quarter the weight of conventional configurations for comparable applications, and further can achieve sufficient electrical isolation of the solenoid coil for use in potentially explosive environments.

To achieve such advantages, exemplary embodiments of the proportional solenoid valve are configured with the coil isolated from the flowing media, and further meets the specific intrinsic safety requirements whereby the coil is electrically isolated from any conductive surface by at least a minimum separation distance, such as for example the flux can. Such electrical isolation by at least a minimum separation distance may be combined with a current limiting circuit or control to aid in preventing electrical contact with a potentially explosive flowing media. Accordingly, embodiments of the present application are configured to satisfy intrinsic safety standards, such as for example IEC 60079-11, for operating in potentially explosive environments. The electrical isolation requirements are achieved by encapsulating the coil in a non-conductive encapsulation material layer to isolate the powered circuit from the flowing media through the valve, while still maintaining other design constraints relating to compact size and magnetic efficiencies.

The proportional solenoid valve includes an entirely encapsulated coil for electrical isolation by at least a minimum separation distance from other conductive components. There also are no voids throughout the encapsulation material. In exemplary embodiments, the encapsulated coil includes a bobbin, which is wound with a coil of magnet wire that is attached to insulated wiring for providing electric current to the coil of magnet wire. The bobbin and magnet wire coil are over-molded during a secondary molding operation with an encapsulation layer to fully encapsulate the coil. The bobbin/coil assembly with the over-molded encapsulation layer satisfies intrinsic safety specifications by adhering the encapsulation layer and the bobbin to each other and to the coil. The configuration in particular addresses the IEC 60079 specifications requiring at least 0.5 mm insulation thickness between any conductive component and the outer perimeter of the encapsulated coil, all while maintaining a component that is void free such that there are no voids throughout the encapsulation layer. In exemplary embodiments, the encapsulation material may be a molded epoxy or a glass filled thermoplastic.

For further encapsulation of the insulated wiring that provides power to the coil, a tower of a non-conductive encapsulation material may be provided to encapsulate the insulated wiring. The tower configuration also addresses the IEC 60079 specifications requiring the 0.5 mm insulation thickness between any conducting wire and other conductive material component by guiding the insulated wiring up through a can slot through the flux can. The tower encapsulation material may be an extension of the encapsulation material that encapsulates the bobbin and magnet wire coil.

In a molded epoxy configuration, the insulated wiring may be soldered directly to the coil of magnet wire and then placed inside a valley created by the coil windings. A film polyimide tape, such as for example KAPTON® tape, may be used to separate the windings from the solder joints. The insulated wire solder joint is then secured via adhesive and threading to ensure that the insulated wiring does not drift during the over-molding process. The insulated wiring is then fed through the encapsulation tower directly and closed off by the mold prior to the epoxy injection. In a molded thermoplastic configuration, a secondary terminal electrically connects the insulated wiring with the coil of magnet wire. The insulated wiring is soldered onto the secondary terminal at one electrical contact, and the coil of magnet wire is wound and soldered at another electrical contact. The terminal is then pressed into slots in the bobbin to retain the terminals during the over-molding process, which encases the tower and coil in a thermoplastic or thermoresin material to cover where the coil wire and insulated wiring contact the secondary terminal.

Aspects of the present application include a proportional solenoid valve that can achieve a compact valve structure with high magnetic efficiency, and that further can achieve electrical isolation of the solenoid coil for use in potentially explosive environments. In exemplary embodiments, a proportional solenoid valve includes a valve body defining an inlet and an outlet for a fluid flow through the valve body and an armature that is moveable along a longitudinal axis from a first closed position to a second open position to control the flow of fluid through the valve. The valve further includes a flux can and an encapsulated coil assembly encompassed within the flux can. The encapsulated coil assembly includes a bobbin, a wire coil wound around the bobbin, and a non-conductive encapsulation layer that encapsulates the bobbin and the wire coil so as to electrically isolate the wire coil from the flux can and other conductive components of the valve. When the solenoid coil is energized, a magnetic field is created which causes the armature to move away from the first position against the valve body toward the second position, thereby opening the valve. The proportional solenoid valve further may include insulated wiring that is electrically connected to the wire coil, and a non-conductive encapsulation tower that encapsulates the insulated wiring so as to maintain the minimum distance between the insulated wiring and the flux can and other conductive components of the valve.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
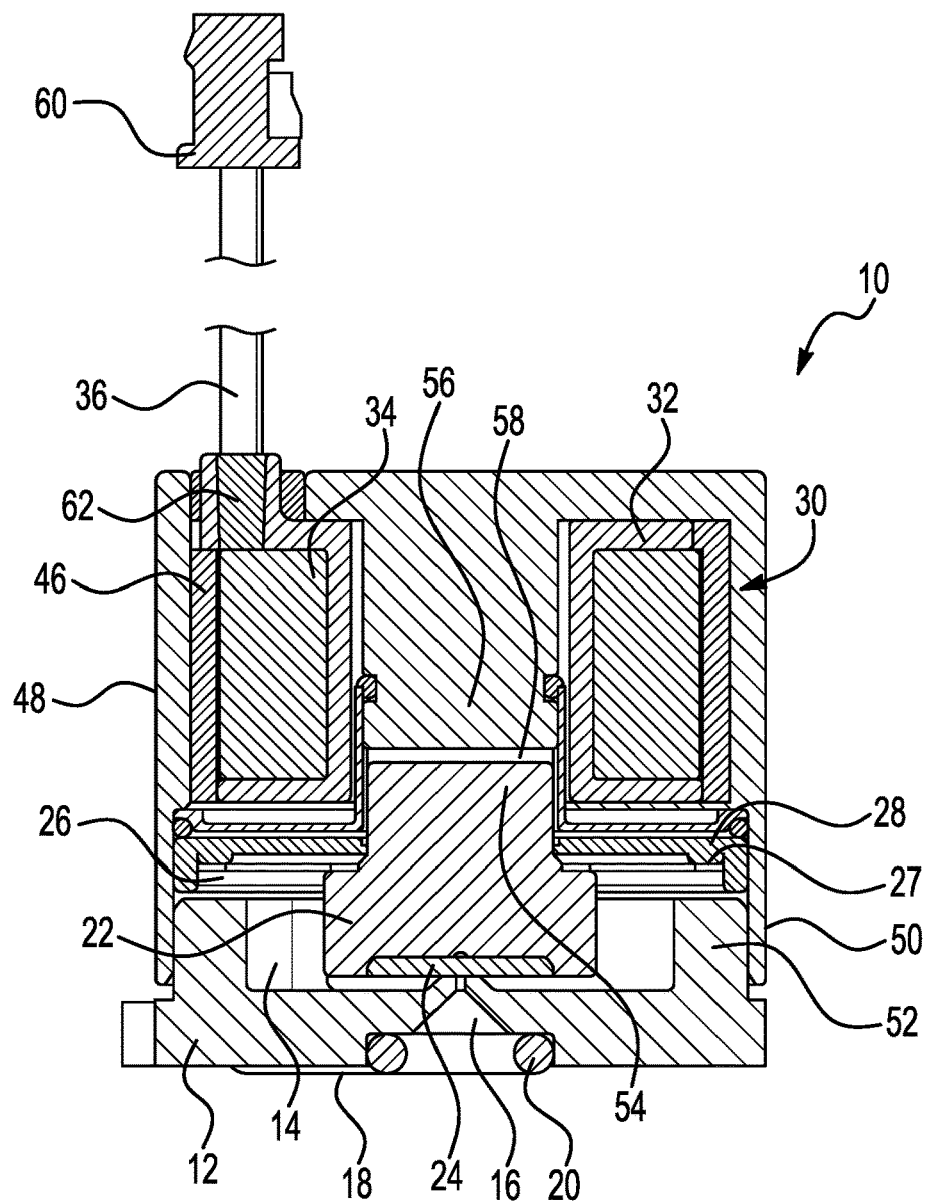
FIG. 1 is a drawing depicting a side cross-sectional view of an exemplary low profile miniature proportional solenoid valve in accordance with embodiments of the present application.

Embodiments of the present application will now be described with reference to the drawings, wherein like reference numerals are used to refer to like elements throughout. It will be understood that the figures are not necessarily to scale.

Aspects of the present application relate to a proportional valve, such as a pneumatic proportional solenoid valve, that can achieve a valve structure that is less than one third the size and less than one quarter the weight of conventional configurations for comparable applications, and further can achieve electrical isolation of the solenoid coil for use in potentially explosive environments. Exemplary embodiments of the proportional solenoid valve are configured with the coil isolated from the flowing media, and further meets the specific intrinsic safety requirements whereby the coil is electrically isolated from any conductive surface of the valve components, such as for example the flux can, by at least a minimum separation distance. Such electrical isolation may be combined with a current limiting circuit or control to aid in preventing electrical contact with a potentially explosive flowing media. As further detailed below, the electrical isolation requirements are achieved by encapsulating the coil in a non-conductive encapsulation material layer to isolate the powered circuit from the flowing media through the valve, while still maintaining other design constraints relating to compact size and magnetic efficiencies that are desirable in typical applications.

Accordingly, embodiments of the present application are configured to satisfy intrinsic safety standards, such as IEC 60079-11, for operating in potentially explosive environments. The primary intrinsic safety requirements that are satisfied include: a minimum separation distance of 0.5 mm of solid insulation between any component conducting current (e.g., the solenoid coil) and any component outside of the perimeter of the fully encapsulated conducting component; no voids inside the molded materials; complete bonding of all components (bobbin, coil of magnet wire, insulated wiring) to the over-molded encapsulation material; low power, low voltage, and low temperature at rated current and maximum operating temperature; and a "Pass" result for an 852 VDC Hi-Pot minimum industry standard test on all valves once completely assembled. With the described configuration and performance, the proportional solenoid valve can achieve highly accurate flow control and repeatability; high pressure capability; low leak performance; coil isolation from other conductive components by at least a minimum separation distance that allows for use in potentially explosive environments, such as for example gas chromatography including hydrogen gas as a flowing media; and relatively small size (e.g., total height including wire bend radius being <25 mm).

FIG. 1 is a drawing depicting a cross-sectional view of an exemplary low profile miniature proportional solenoid valve 10 in accordance with embodiments of the present application. The proportional solenoid valve 10 includes a valve body 12 that defines an inlet port 14 and an outlet port 16. When the valve is open, fluid, such as a gas for example, can flow from the inlet port and through the outlet port. The ports are sealed by first and second O-rings 18 and 20. An armature 22 has a longitudinal axis and is moveable along the longitudinal axis between a first position and a second position. The first position may be a closed position, and in the second position the valve may be maximally open to provide a maximum flow of gas or other fluid through the inlet and outlet ports. In the first position, which is depicted in FIG. 1, as referenced above the valve is closed, which prevents fluid flow between the inlet port 14 and outlet port 16. The armature may include an elastomeric element 24 that provides an additional seal against the outlet port when the valve is closed, i.e., when the armature 22 is in the first or closed position.

The proportional solenoid valve 10 further may include a flux washer, and a spring having an outer edge that is secured by the flux washer, the flux washer acting as a spring pivot that permits flexing of the spring. When the solenoid coil is energized, the magnetic field causes the armature to move away from the first position against the spring force of the spring toward the second position, thereby opening the valve. Referring to FIG. 1 as an exemplary embodiment, the armature 22 may be biased in the closed position when the valve is de-energized by a proportional spring configured as a flat spring 26, which may be preloaded into a flux washer 28 to provide the closed position bias. The flat spring 26 is secured in position at an outer edge 27 by the flux washer 28. The flux washer may be made of a magnetic material, and thus the flux washer acts both as a part of the magnetic flux path as a flux coupler between a flux can and the armature, and as a spring pivot that permits the flat spring 26 to flex to permit opening of the valve. The flat spring also may be made of a magnetic material to aid in the transmission of magnetic flux lines when the valve is energized.

The proportional solenoid valve includes an entirely encapsulated wire coil assembly 30 for electrical isolation of the power circuit from other conductive components by at least a minimum separation distance. There also are no voids throughout the encapsulation material. In exemplary embodiments, the encapsulated coil assembly 30 includes a bobbin 32, which is wound with a coil of magnet wire 34 that is electrically connected to insulated wiring 36 for providing electrical current to the coil of magnet wire 34.

Figure 2:
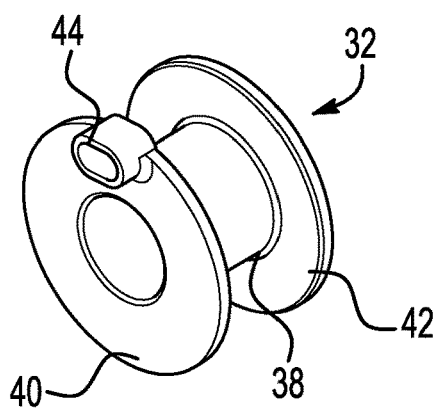
FIG. 2 is a drawing depicting a perspective view of a bobbin component for use in the proportional solenoid valve of FIG. 1.

FIG. 2 is a drawing depicting a perspective view of the bobbin component 32 in isolation for use in the proportional solenoid valve of FIG. 1. As is conventional the bobbin 32 is made of a suitable non-conductive material, such as a rigid plastic material, that is able to support the magnet wire coil 34. The bobbin 32 may have a spool configuration by which a central body 38 extends between two outer flanges 40 and 42, with the central body having a diameter that is less than a diameter of the flanges. The magnet wire coil 34 is thus wound about the central body 38 between the outer flanges 40 and 42. The bobbin 32 further may include a wiring housing 44 that extends from one of the outer flanges, such as for example outer flange 40. The wiring housing 44 defines a channel through which the insulated wiring 36 extends for electrical connection with the coil 34.

Figure 3:
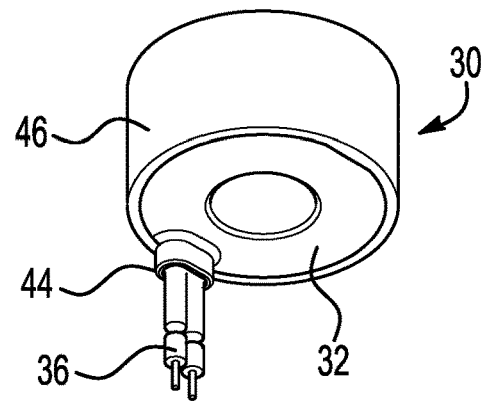
FIG. 3 is a drawing depicting a perspective view of an encapsulated coil assembly for use in the proportional solenoid valve of FIG. 1.
Figure 4:
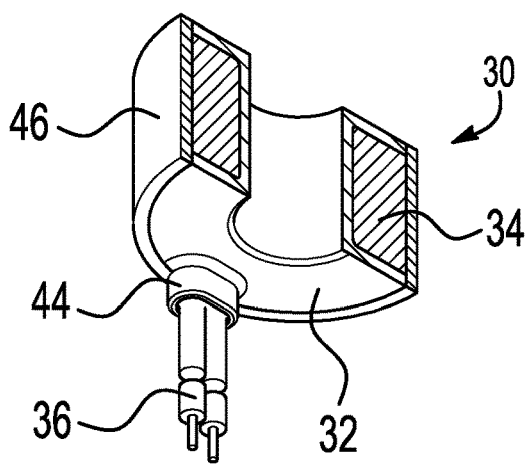
FIG. 4 is a drawing depicting a cross-sectional view of the encapsulated coil assembly of FIG. 3.

FIG. 3 is a drawing depicting a perspective view of the encapsulated coil assembly 30 in isolation for use in the proportional solenoid valve of FIG. 1. FIG. 4 is a drawing depicting a cross-sectional view of the encapsulated coil assembly 30 of FIG. 3. Further as to the encapsulated coil assembly 30, the bobbin 32 and magnet wire coil 34 is over-molded during a secondary molding operation with an encapsulation layer 46 to fully encapsulate the coil. The encapsulation layer 46 may be made of any suitable non-magnetic, non-conducting material that can be applied in an over-molding process (providing the process temperature of the material is less than the rated temperature of the magnet wire insulation) during manufacture, such as an epoxy or thermoplastic material or the like. In exemplary embodiments, the encapsulation tower 46 material may be a molded epoxy material or a glass filled thermoplastic material such as a thermoresin.

The encapsulated coil assembly 30, which includes the bobbin 32 and magnet wire coil 34 with the over-molded encapsulation layer 46, satisfies the specifications referenced above for intrinsic safety by adhering the encapsulation layer and the bobbin to each other and to the coil. The configuration in particular satisfies the IEC 60079 specifications requiring a 0.5 mm minimum insulation thickness between any conductive component and the outer perimeter of the encapsulated coil, all while maintaining a component that is void free such that there are no voids throughout the encapsulation layer.

Referring principally back to FIG. 1, the encapsulated coil assembly 30 is housed within a flux can 48 in a manner by which the encapsulated coil assembly 30 is fully encompassed within the flux can. In particular, the flux can 48 may have an end extension 50 that extends around at least a portion of the valve body 12, such as around a ridge 52 of the valve body 12. The end extension 50 of the flux can 48 also may extend around the flux washer 28, which permits as referenced above the flux washer 28 to act as part of the magnetic flux path as a flux coupler between the flux can and the armature.

The encapsulated coil assembly 30 may be configured as a cylindrical ring defining a central opening, and the armature 22 has an upper end 54 that is moveable through the central opening. The flux can 48 includes a central portion constituting a fixed pole 56 that is positioned opposite the upper end 54 of the armature 22. The fixed pole 56 thus extends partially through the central opening of the encapsulated coil assembly 30. Accordingly, as seen in the closed position of the cross-sectional view of FIG. 1 in particular, the fixed pole 56 and the upper end 54 of the armature 22 define a stroke distance 58 within the central opening of the solenoid coil in which the armature is moveable between the first (closed) position and the second (fully open) position.

As referenced above, the insulated wiring 36 supplies current to the magnet wire coil 34, and thus the insulated wiring 36 may extend from the coil 34 through the flux can 48 to provide an electrical connection to an electrical connector 60 for energizing the solenoid coil. The electrical connector typically would be electrically connected to a power source (not shown) for energizing the solenoid coil. Exemplary configurations for positioning the insulated wiring 36 and connecting the insulated wiring to the coil 34 are described in more detail below.

In an example of operation of the proportional solenoid valve 10, when the solenoid (magnet wire) coil 34 is energized, a magnetic field is created. The magnetic flux lines loop out of the solenoid coil 34 and through the flux can 48, along the side and into the flux washer 28. The flux lines then jump an air gap from the flux washer directly into the armature 22 and back into the flux can through the stroke distance gap 58. The magnetic field causes the armature to move off the valve body against the spring force of the flat spring 26, thereby opening the valve. At maximum energy, the armature has moved to the second, fully open position. When the armature has moved away from the valve body, thereby opening the valve, gas or other fluid can flow between the inlet port 14 and the outlet port 16. The armature also may settle at positions intermediate of the first (closed) position and the second (fully open) position depending upon the degree of energizing of the solenoid coil below the maximum. In this manner, a fine proportional control of fluid flow through the valve is achieved. In addition, because of the configuration of the encapsulated coil assembly 30, whereby the solenoid coil 34 is electrically isolated from other conductive material components by at least a minimum separation distance in accordance with intrinsically safety specifications, such as IEC 60079, the proportional solenoid valve 10 may be used in potentially explosive environments, such as for example gas chromatography including hydrogen gas as a flowing media or in a refinery where the gas mixture in the building could ignite given a spark.

Figure 5:
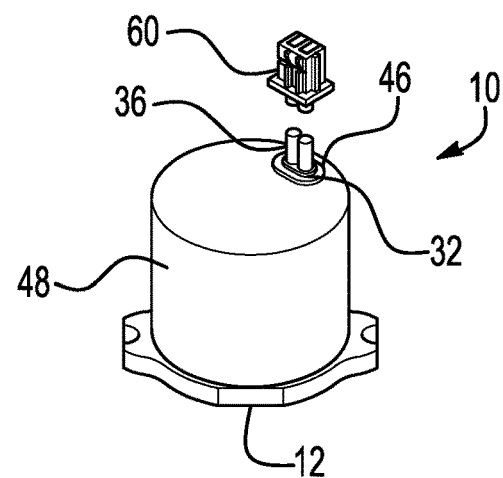
FIG. 5 is a drawing depicting a perspective view of the proportional solenoid valve of FIG. 1.

FIG. 5 is a drawing depicting a perspective view of the proportional solenoid valve 10 of FIG. 1. FIG. 5 illustrates the overall configuration whereby the flux can 48 extends over the valve body 12. The insulated wiring 36 extends upward through the flux can 40 to be electrically connected to the electrical connector 60. FIG. 5 further depicts the encapsulation layer 46 that encapsulates the bobbin 32, particularly about the wiring housing 44 (see also FIG. 1).

As referenced above, the insulated wiring 36 supplies current to the magnet wire coil 34, and further encapsulation may be provided as to the insulated wiring where the insulated wiring extends through the flux can. For further electrical isolation, an encapsulation tower 62 (see FIG. 1) made of a non-conductive encapsulation material may be provided to encapsulate the insulated wiring 36 where the insulated wiring extends through the flux can. The tower configuration of the encapsulation tower 62 also satisfies intrinsic safety specifications, such as the IEC 60079 specification, requiring a minimum 0.5 mm insulation thickness between any conducting wire and other conductive material component by guiding the insulated wiring up through a flux can slot through the flux can 48.

As referenced above, in exemplary embodiments, the encapsulation material may be a molded epoxy or a glass filled thermoplastic. In a first embodiment as depicted in FIGS. 1-5, the encapsulation material is a molded epoxy, which may be injection molded during the manufacturing process so as to be positioned to encapsulate the bobbin and coil within the confines of the flux can as described above. In the molded epoxy configuration, the insulated wiring 36 may be soldered directly to the magnet wire coil 34 and then placed inside a valley created by the coil windings. The insulated wiring solder joint is then secured via adhesive and threading to ensure that the insulated wiring does not drift during the over-molding process of the encapsulation material. The insulated wiring is then fed through the encapsulation tower 62 directly and closed off by the mold prior to the epoxy injection.

Figure 6:
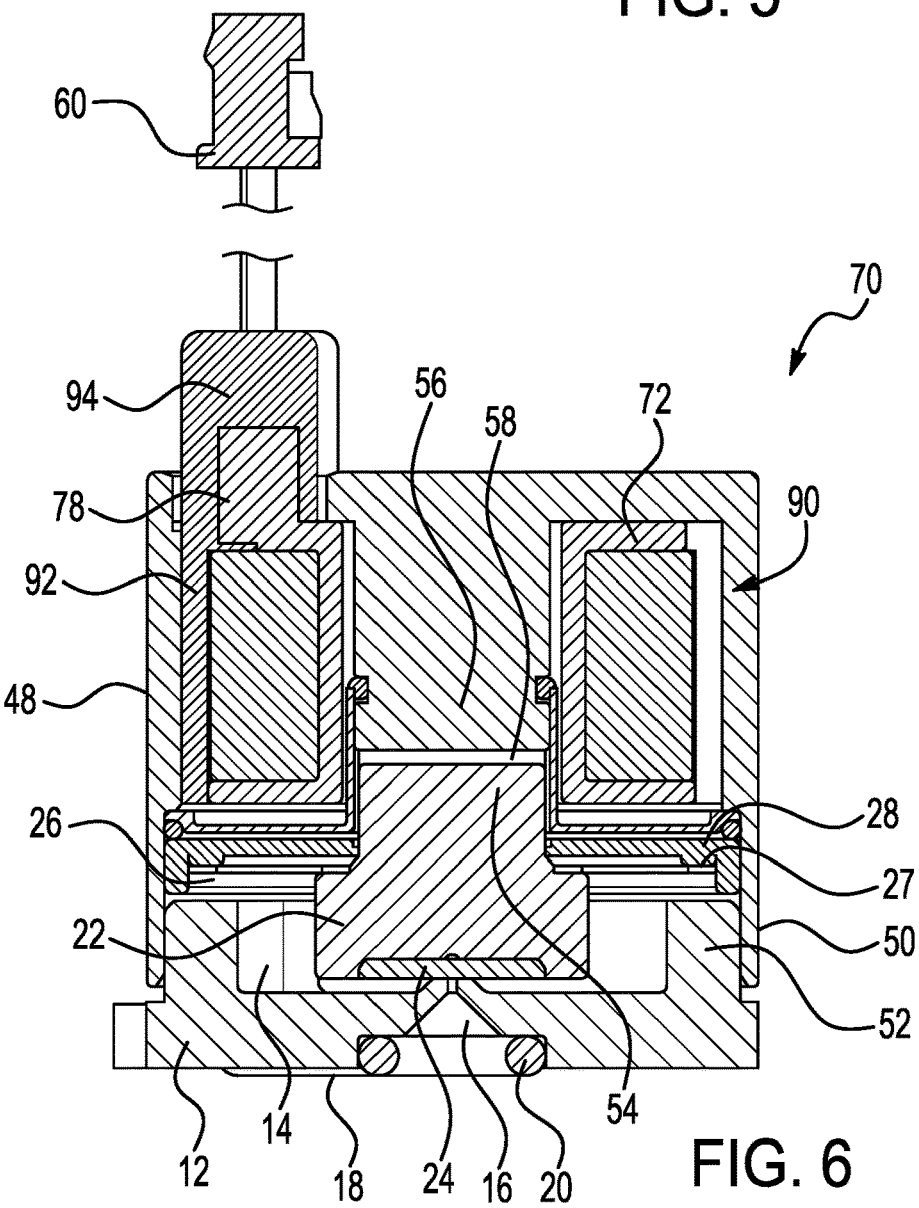
FIG. 6 is a drawing depicting a side cross-sectional view of another configuration of an exemplary low profile miniature proportional solenoid valve in accordance with embodiments of the present application.
Figure 7:
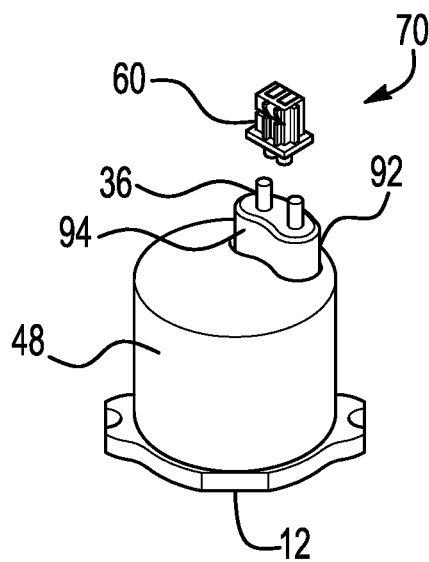
FIG. 7 is a drawing depicting a perspective view of the proportional solenoid valve of FIG. 6.

FIGS. 6-10 depict a second embodiment of a proportional solenoid valve 70 that is a variation on the embodiment of FIGS. 1-5. The two embodiments share several features in common, and thus like reference numerals are used to denote like components. FIG. 6 is a drawing depicting a side cross-sectional view of the exemplary low profile miniature proportional solenoid valve 70. FIG. 7 is a drawing depicting a perspective view of the proportional solenoid valve 70 of FIG. 6. The like components and operation generally are comparable as described above with respect to FIGS. 1-5.

The proportional solenoid valve 70 principally differs from the proportional solenoid valve 10 in the use of a molded thermoplastic or thermoresin configuration for the encapsulation material. This results in a different configuration of the encapsulation tower and the manner by which the insulated wiring 36 is encapsulated and connected to the magnet wire coil 34. Generally, in a molded thermoplastic or thermoresin configuration, a secondary terminal electrically connects the insulated wiring with the magnet wire coil. The insulated wiring is soldered to the secondary terminal at one contact, and the coil of magnet wire is wound around the bobbin and soldered to the secondary terminal at a second contact different from the first contact. The secondary terminal is pressed into slots in the bobbin to retain the terminal during the over-molding process, which encases the electrical connection in the thermoplastic or thermoresin material to provide the requisite electrical isolation.

Figure 8:
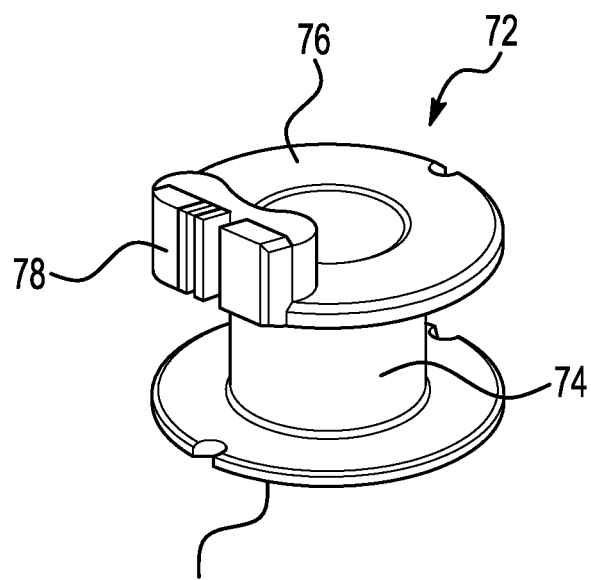
FIG. 8 is a drawing depicting a perspective view of a bobbin component for use in the proportional solenoid valve of FIG. 6.
Figure 9:
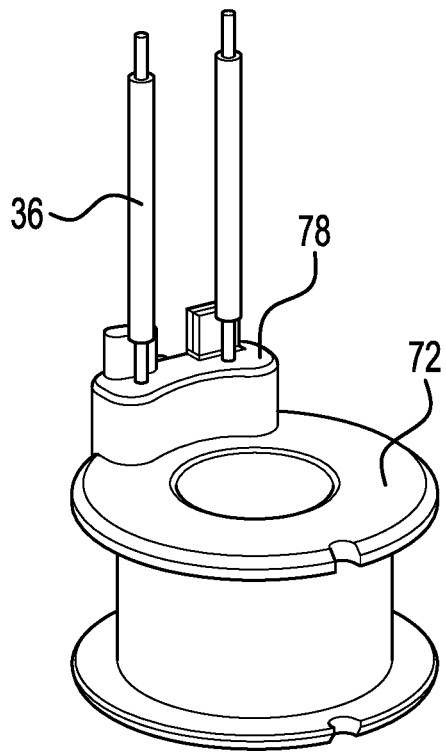
FIG. 9 is an isometric drawing further depicting the bobbin with a terminal connector that the houses a secondary terminal.

FIG. 8 is a drawing depicting a perspective view of a bobbin component 72 for use in the proportional solenoid valve of FIG. 6. Similarly as in the previous embodiment, the bobbin 72 is made of a suitable non-conductive material, such as a rigid plastic material, that is able to support the magnet wire coil 34. The bobbin 72 also may have a spool configuration by which a central body 74 extends between two outer flanges 76 and 77, with the central body having a diameter that is less than a diameter of the flanges. The magnet wire coil 34 is thus wound about the central body 74 between the outer flanges 76 and 77. In the embodiment of FIG. 8, the bobbin 72 further includes a terminal connector 78 that extends from one of the outer flanges, such as for example outer flange 76. The terminal connector 78 defines a channel through which the magnet wire coil 34 extends for electrical connection with the insulated wiring 36. In addition, such channel ends in slots 80 may be configured to receive a secondary terminal for electrical connection of the magnet wire coil 34 with the insulated wiring 36. FIG. 9 is an isometric drawing further depicting the bobbin 72 with the terminal connector 78, from which the insulated wiring 36 extends.

Figure 10:
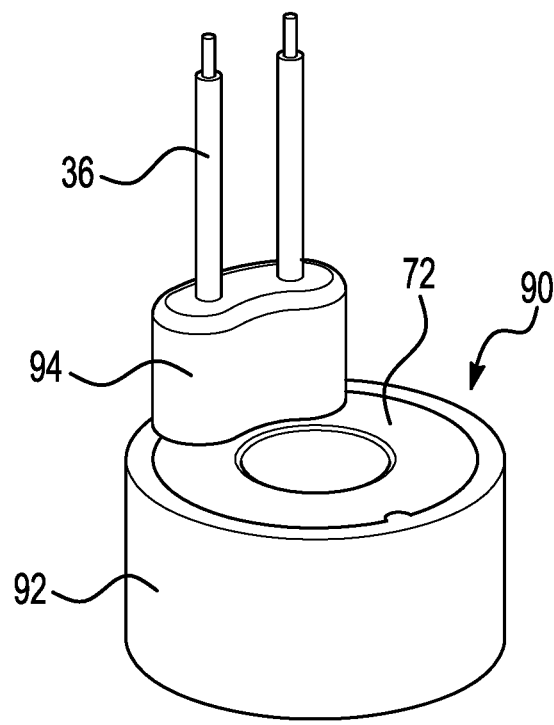
FIG. 10 is a drawing depicting a perspective view of an encapsulated coil assembly for use in the proportional solenoid valve of FIG. 6.

FIG. 10 is a drawing depicting a perspective view of an encapsulated coil assembly 90 for use in the proportional solenoid valve of FIG. 6. In looking at FIG. 10 in combination with FIG. 9, FIG. 10 illustrates the components of FIG. 9 as further encapsulated with an encapsulation material layer 92 to achieve the requisite electrical isolation. As part of the over-molding process, for further electrical isolation, the terminal connector 78 with a secondary terminal is encapsulated within an encapsulation tower 94. Such over-molding process encases the electrical connections of the coil and insulated wiring at the secondary terminal in the thermoplastic or thermoresin encapsulation material. The encapsulation tower may be an extension of the encapsulation material layer 92 that provides the electrical isolation of the bobbin 72 with the wound magnet wire coil 34.

Referring to FIGS. 6 and 10 in combination, in the encapsulated coil assembly 90, the bobbin 72 and magnet wire coil 34 are over-molded during a secondary molding operation with the encapsulation layer 92 to fully encapsulate the coil, which in this embodiment is a glass filled thermoplastic or thermoresin material as referenced above. The encapsulation layer 92 further may extend upward from the bobbin so as to constitute an encapsulation tower 94 that encapsulates the terminal connector 78, and the encapsulation tower 94 may be formed as a separate processing step. The encapsulated coil assembly 90, which includes the bobbin 72 and magnet wire coil 34 with the over-molded encapsulation layer 92 and tower 94, also satisfies the IEC 60079 specifications referenced above for intrinsic safety by adhering the encapsulation layer and the bobbin to each other and to the coil. The configuration in particular satisfies the IEC 60079 specifications requiring a minimum 0.5 mm insulation thickness between any conductive component and the outer perimeter of the encapsulated coil and insulated wiring, all while maintaining a component that is void free.

Referring principally back to FIG. 6, the proportional solenoid valve otherwise is configured an operates comparably as described above with respect to FIGS. 1-5. The encapsulated coil assembly 90 is housed within the flux can 48, and operates in conjunction with the spring 26 and flux washer 28 to constitute a magnetic flux path as a flux coupler between the flux can 48 and the armature 22. The encapsulated coil assembly 90 also may be configured as a cylindrical ring whereby the fixed pole 56 of the flux can 48 and the upper end 54 of the armature 22 define the stroke distance 58 though which the armature 22 moves during operation.

Aspects of the present application include a proportional solenoid valve that can achieve a compact valve structure with high magnetic efficiency, and that further can achieve electrical isolation of the solenoid coil for use in potentially explosive environments. In exemplary embodiments, a proportional solenoid valve includes a valve body defining an inlet and an outlet for a fluid flow through the valve body; an armature having a longitudinal axis, the armature being moveable along the longitudinal axis from a first position to a second position, wherein the first position is a closed position in which the armature is against the valve body to prevent fluid flow between the inlet and the outlet, and the second position is an open position in which the armature is moved away from the valve body to permit fluid flow between the inlet and the outlet; a flux can; and an encapsulated coil assembly encompassed within the flux can, the encapsulated coil assembly comprising a bobbin, a wire coil wound around the bobbin, and a non-conductive encapsulation layer that encapsulates the bobbin and the wire coil so as to electrically isolate the wire coil from the flux can. When the solenoid coil is energized, a magnetic field is created which causes the armature to move away from the first position against the valve body toward the second position, thereby opening the valve. The proportional solenoid valve may include one or more of the following features, either individually or in combination.

In an exemplary embodiment of the proportional solenoid valve, the valve further includes insulated wiring that is electrically connected to the wire coil, and a non-conductive encapsulation tower that encapsulates the insulated wiring so as to maintain a separation distance between the insulated wiring and the flux can.

In an exemplary embodiment of the proportional solenoid valve, the encapsulation tower comprises an extension of the encapsulation layer that encapsulates the bobbin and the wire coil.

In an exemplary embodiment of the proportional solenoid valve, the valve further includes a secondary terminal that electrically connects the insulated wiring to the wire coil, wherein the insulated wiring is connected to a first contact of the secondary terminal and the wire coil is connected to a second contact of the secondary terminal.

In an exemplary embodiment of the proportional solenoid valve, the bobbin includes a terminal connector that defines one or more slots, and the secondary terminal is positioned within the one or more slots.

In an exemplary embodiment of the proportional solenoid valve, the encapsulation layer includes an encapsulation tower that encapsulates the terminal connector.

In an exemplary embodiment of the proportional solenoid valve, the encapsulation layer is made of a molded epoxy material.

In an exemplary embodiment of the proportional solenoid valve, the encapsulation layer is made of a thermoplastic material.

In an exemplary embodiment of the proportional solenoid valve, a minimum separation distance of the wire coil and any conductive component outside of a perimeter of the encapsulated coil assembly is 0.5 mm, and there are no voids throughout the encapsulation layer.

In an exemplary embodiment of the proportional solenoid valve, the flux can and the armature define an air gap, and magnetic flux lines pass from the armature across the air gap directly into the flux can.

In an exemplary embodiment of the proportional solenoid valve, the air gap defines a stroke distance of the armature.

In an exemplary embodiment of the proportional solenoid valve, the valve further includes a flux washer; and a spring having an outer edge that is secured by the flux washer, the flux washer acting as a spring pivot that permits flexing of the spring; wherein when the solenoid coil is energized the magnetic field causes the armature to move away from the first position against the spring force of the spring, thereby opening the valve; and wherein the encapsulation material that encapsulates the bobbin and the wire coil further electrically isolate the wire coil from the flux washer and the spring.

In an exemplary embodiment of the proportional solenoid valve, the flux washer and the flux can define another air gap, and magnetic flux lines pass from the flux can across another air gap directly into the flux washer.

In an exemplary embodiment of the proportional solenoid valve, the spring is preloaded to bias the armature in the first position.

In an exemplary embodiment of the proportional solenoid valve, the spring is a flat spring.

In an exemplary embodiment of the proportional solenoid valve, the spring is made of a magnetic material.

In an exemplary embodiment of the proportional solenoid valve, the encapsulated coil assembly is a cylindrical ring defining a central opening, and the armature has an upper end that is moveable through the central opening.

In an exemplary embodiment of the proportional solenoid valve, the flux can has a central portion constituting a fixed pole that is positioned opposite the upper end of the armature, and the fixed pole extends partially through the central opening of the encapsulated coil assembly to define a stroke distance within the central opening of the solenoid coil in which the armature is moveable between the first position and the second position.

In an exemplary embodiment of the proportional solenoid valve, the flux can has an end extension that extends around at least a portion of the valve body.

In an exemplary embodiment of the proportional solenoid valve, the flux can has an end extension that extends around the flux washer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A proportional solenoid valve comprising:
a valve body defining an inlet and an outlet for a fluid flow through the valve body;
an armature having a longitudinal axis, the armature being moveable along the longitudinal axis from a first position to a second position, wherein the first position is a closed position in which the armature is against the valve body to prevent fluid flow between the inlet and the outlet, and the second position is an open position in which the armature is moved away from the valve body to permit fluid flow between the inlet and the outlet;
a flux can including a can slot;
an encapsulated coil assembly encompassed within the flux can, the encapsulated coil assembly comprising a bobbin, a wire coil wound around the bobbin, and a non-conductive encapsulation layer that encapsulates the bobbin and the wire coil so as to electrically isolate the wire coil from the flux can;
insulated wiring that is electrically connected to the wire coil; and
a non-conductive encapsulation tower that encapsulates the insulated wiring so as to maintain a separation distance between the insulated wiring and the flux can;
wherein the encapsulation tower forms a channel through the can slot of the flux can and the insulated wiring is fed through the channel of the encapsulation tower directly; and wherein the encapsulation tower guides the insulated wiring up through the can slot through the flux can;
wherein when the solenoid coil is energized, a magnetic field is created which causes the armature to move away from the first position against the valve body toward the second position, thereby opening the valve.

2. The proportional solenoid valve of claim 1, wherein the encapsulation tower comprises an extension of the encapsulation layer that encapsulates the bobbin and the wire coil.

3. The proportional solenoid valve of claim 1, further comprising a terminal that electrically connects the insulated wiring to the wire coil, wherein the insulated wiring is connected to a first contact of the terminal and the wire coil is connected to a second contact of the terminal.

4. The proportional solenoid valve of claim 3, wherein the bobbin includes a terminal connector that defines one or more slots, and the terminal is positioned within the one or more slots.

5. The proportional solenoid valve of claim 1, wherein the encapsulation layer is made of a molded epoxy material.

6. The proportional solenoid valve of claim 1, wherein the encapsulation layer is made of a thermoplastic material.

7. The proportional solenoid valve of claim 1, wherein a minimum separation distance of the wire coil and any conductive component outside of a perimeter of the encapsulated coil assembly is 0.5 mm.

8. The proportional solenoid valve of claim 1, wherein the flux can and the armature define an air gap, and magnetic flux lines pass from the armature across the air gap directly into the flux can.

9. The proportional solenoid valve of claim 8, wherein the air gap defines a stroke distance of the armature.

10. The proportional solenoid valve of claim 1, further comprising:
a flux washer; and
a spring having an outer edge that is secured by the flux washer, the flux washer acting as a spring pivot that permits flexing of the spring;
wherein when the solenoid coil is energized the magnetic field causes the armature to move away from the first position against the spring force of the spring, thereby opening the valve; and
wherein the encapsulation material that encapsulates the bobbin and the wire coil further electrically isolate the wire coil from the flux washer and the spring.

11. The proportional solenoid valve of claim 10, wherein the flux washer and the flux can define another air gap, and magnetic flux lines pass from the flux can across the another air gap directly into the flux washer.

12. The proportional solenoid valve of claim 10, wherein the spring is preloaded to bias the armature in the first position.

13. The solenoid proportional valve of claim 10, wherein the spring is a flat spring.

14. The proportional solenoid valve of claim 10, wherein the spring is made of a magnetic material.

15. The proportional solenoid valve of claim 1, wherein the encapsulated coil assembly is a cylindrical ring defining a central opening, and the armature has an upper end that is moveable through the central opening.

16. The proportional solenoid valve of claim 15, wherein the flux can has a central portion constituting a fixed pole that is positioned opposite the upper end of the armature, and the fixed pole extends partially through the central opening of the encapsulated coil assembly to define a stroke distance within the central opening of the solenoid coil in which the armature is moveable between the first position and the second position.

17. The proportional solenoid valve of claim 1, wherein the flux can has an end extension that extends around at least a portion of the valve body.

18. The proportional solenoid valve of claim 10, wherein the flux can has an end extension that extends around the flux washer.

* * * * *